(12) United States Patent
Karmi et al.

(10) Patent No.: US 7,483,699 B2
(45) Date of Patent: Jan. 27, 2009

(54) OVERHEAD MESSAGE UPDATE WITH DECENTRALIZED CONTROL

(75) Inventors: Gadi Karmi, San Diego, CA (US); Matthew S. Grob, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 734 days.

(21) Appl. No.: 09/158,938

(22) Filed: Sep. 22, 1998

(65) Prior Publication Data
US 2003/0190937 A1 Oct. 9, 2003

(51) Int. Cl.
H04Q 7/20 (2006.01)
H04M 11/10 (2006.01)
H04K 1/00 (2006.01)

(52) U.S. Cl. .................................. 455/432.2; 455/412
(58) Field of Classification Search ................ 455/38.3, 455/574, 434, 343, 418, 419, 515, 432, 412, 455/432.2; 380/30
See application file for complete search history.

(56) References Cited

U.S. PATENT DOCUMENTS

| | | | |
|---|---|---|---|
| 4,401,307 A | 8/1983 | Dechavanne | 277/550 |
| 4,901,307 A | 2/1990 | Gilhousen et al. | 370/320 |
| 5,103,459 A | 4/1992 | Gilhousen et al. | 375/142 |
| 5,109,390 A | 4/1992 | Gilhousen et al. | 375/130 |
| 5,146,500 A * | 9/1992 | Maurer | 380/30 |
| 5,392,287 A | 2/1995 | Tiedemann, Jr. et al. | 370/311 |
| 5,396,537 A * | 3/1995 | Schwendeman | 340/7.23 |
| 5,404,355 A * | 4/1995 | Raith | 455/343 |
| 5,490,165 A | 2/1996 | Blakeney et al. | 375/267 |
| 5,509,015 A * | 4/1996 | Tiedemann, Jr. et al. | 370/311 |
| 5,544,196 A * | 8/1996 | Tiedemann, Jr. et al. | 375/145 |
| 5,544,223 A * | 8/1996 | Robbins et al. | 455/426 |
| 5,729,540 A * | 3/1998 | Wegrzyn | 370/336 |
| 5,745,860 A * | 4/1998 | Kallin | 455/574 |
| 5,752,201 A * | 5/1998 | Kivari | 455/574 |

(Continued)

FOREIGN PATENT DOCUMENTS

WO    WO 93/18596 A1 *  9/1993

OTHER PUBLICATIONS

*The Penguin Dictionary of Physics*, Valerie Illingworth, Market House Books Ltd., Second Edition, Penguin Books, New York, USA (1977).

Primary Examiner—William D Cumming
(74) Attorney, Agent, or Firm—Stephen C. Durat; Francois A. Pelaez; Thomas R. Rouse

(57) ABSTRACT

A system and method for providing a simple, but effective technique for communicating overhead messages in a wireless communication system providing access to a decentralized network, while achieving bandwidth savings as well as minimizing power consumption. In one embodiment, a wireless base station which is connected to a decentralized network transmits a sequence of signatures for overhead messages to a mobile unit. The mobile unit wakes up receives the signatures and compares them to signatures stored at the mobile unit. If the signatures received by the mobile unit are different from the signatures stored at the mobile unit, the mobile unit stays awake to receive the overhead messages to be transmitted by the wireless base station. If the signatures received by the mobile unit are the same as the signatures stored at the mobile unit, the mobile unit may go back to sleep.

10 Claims, 5 Drawing Sheets

U.S. PATENT DOCUMENTS

| | | | |
|---|---|---|---|
| 5,781,856 A * | 7/1998 | Jacobs et al. | 455/574 |
| 5,794,137 A * | 8/1998 | Harte | 455/343 |
| 5,909,651 A * | 6/1999 | Chander et al. | 455/466 |
| 5,918,170 A * | 6/1999 | Oksanen et al. | 455/343 |
| 6,029,065 A * | 2/2000 | Shah | 455/419 |
| 6,038,436 A * | 3/2000 | Priest | 455/38.3 |
| 6,243,581 B1 * | 6/2001 | Jawanda | 455/432.2 |

* cited by examiner

US 7,483,699 B2

OVERHEAD MESSAGE UPDATE WITH DECENTRALIZED CONTROL

BACKGROUND OF THE INVENTION

1. Field of the Invention

The invention relates in general to wireless communication systems, and more particularly, to overhead channel information delivery in wireless communication systems.

2. Description of the Related Art

In a cellular communications system, the area to be covered is divided up into a number of small areas called cells, with one base station (BS) positioned to give service or coverage to the mobile units within a cell. Each BS is connected to a base station controller (BSC) which is used to control several BSs and the provision of communication service to a mobile unit as it travels from one cell to another. The BSC's are in turn connected to a mobile switching center (MSC), which is generally a telephone exchange with special software to handle the mobility aspects of the mobile units. Most cellular communications systems consist of a number of MSCs each with their own BSs, and interconnected by means of fixed links. The MSCs interconnect to the public switched telephone network (PSTN) for both outgoing calls to and incoming calls from fixed telephones.

A mobile unit is connected, ultimately, to the MSC through over-the-air radio frequency (RF) reverse (mobile to BS) link to and the RF forward (BS to mobile) link from the BS. RF signals are exchanged between a respective mobile unit and one or more base stations over these links. Mobile units do not communicate directly with one another. Mobile unit to mobile unit communications across the span of one or more cells occurs through the base stations providing service to the mobile units desiring communication. Base stations communicate with a BSC using various media such as ground based wires or a microwave link, for example. The BSC can route calls to a PSTN through the MSC or can route packets to a packet switched network, such as the Internet. The base station controller also coordinates the operation of base stations within the system during handoff, for example.

A common feature of the RF forward and reverse links of many cellular systems is multiple users using a single communication channel occupying a limited frequency range. Cellular systems employ a variety of techniques for allowing multiple users to use a single communication channel occupying a limited frequency range. Code Division Multiple Access (CDMA) is one such technique. A popular standard for CDMA can be found in the TIA/EIA Standard TIA/EIA-95-B entitled "Mobile Station-Base Station Compatibility Standard for Dual Mode Wideband Spread Spectrum Cellular System." In CDMA, multiple users can simultaneously use the whole communication channel without having to coordinate the timing of their transmission or the portion of the communication channel each user utilizes. More details on CDMA and spread spectrum communications can be found in, *CDMA Principles of Spread Spectrum Communications*, by Andrew J. Viterbi, Addison-Wesley Publishing Company, Reading, Mass., 1996. In contrast to CDMA, two other multiple access techniques either coordinate the timing of user transmissions, time division multiple access (TDMA), or the portion of the communication channel a user uses, frequency division multiple access (FDMA).

Regardless of the technique employed to provide multiple access, in a typical cellular system, the forward communications link includes one or more data channels, a pilot channel, and one or more paging channels, all of which are transmitted from the base station to mobile units. The pilot channel or pilot signal serves to define the boundaries of the cell area served by a base station. In a CDMA cellular system in accordance with IS-95, the pilot signal serves other purposes as well. For example, the pilot signal: provides for time reference and for amplitude and phase tracking; and allows mobile units to identify and become synchronized with the various base stations that are within range of their communication capability. The set of data channels carry the data associated with the various communication sessions (usually phone calls) and are directed to individual mobile units. These data channels are often called traffic channels. The paging channels are used by the base stations to notify mobile units when a request to communicate has been received. A paging channel is also used to transmit overhead messages. Overhead messages contain information that enables mobile unit-to-base station communication.

Overhead messages are not addressed to any specific mobile unit but are intended for distribution to each mobile unit within the corresponding coverage area. In an IS-95 CDMA cellular system, there are four types of overhead messages: system parameters, access parameters, channel list, and neighbor list overhead messages. Each type of overhead message must be broadcast at least once per second. For example, the neighbor list overhead message continually broadcasts a list of neighboring base stations through which communication may be possible. The mobile units use the neighbor list to monitor signals from the neighboring base stations in the event that the mobile unit enters the coverage area of neighboring base stations. Cellular systems employing other communications standards may have other types of overhead messages.

The overhead messages are typically received and processed by a mobile unit when a mobile unit is not engaged in a call or attempting to engage in a call, (i.e., when it is in an 'idle state'). The term idle state is somewhat of a misnomer because the mobile unit can be very busy in the idle state. During the idle state, the mobile station periodically wakes up and listens to the paging channel and processes the messages on that channel. The overhead messages may remain the same for a substantial period of time during which the mobile station periodically wakes up and listens to the paging channel. Since it is not desirable to have the mobile unit wake up, receive the overhead message, and decode it only to determine that the overhead message is the same as the previous message that was decoded earlier, in the interest of conserving battery power, a sequence number is transmitted along with the overhead message. When the mobile unit wakes up, it receives the sequence number of the overhead message and decides whether to stay awake and receive the overhead message. In many instances, the mobile unit will go back to sleep after receiving the sequence number because the sequence number is the same as the sequence number received the last time the mobile unit woke up. Since listening for overhead messages requires a certain amount of power and since the listening function is performed frequently (as often as once per second), limiting the amount of time a mobile unit performs the listening function reduces the overall power consumption of that mobile unit and therefore increases the life of any battery or other power storage system utilized by that mobile unit. Significant power savings may occur because in many instances the overhead messages may remain the same for a substantial period of time.

In many cellular systems, the overhead messages and the sequence numbers to be transmitted by a base station are controlled from a central location such as a base station manager (BSM). One reason for providing this centralized control arises from the nature of the service typically provided by cellular systems. Cellular systems typically provide voice service or connection to and from a land based PSTN. A PSTN typically has a highly concentrated switching structure. As a result, cellular services desiring to interface to it have had to use central switches for routing calls. In many cellular systems providing voice service via a PSTN, phone calls are bundled at a central switch (MSC or MSCs) for transmission through the PSTN or unbundled for transmission through the wireless network. Consequently, due to the existence of a central location (BSM or MSC) at which links from many BSs terminated, it has been logical to take advantage of this central location to control remotely from the central location the programming of overhead messages and sequence numbers at each of the base stations in the cellular system. In contrast, cellular systems providing packet data service rather than voice service typically interface to a highly decentralized network. An example of a decentralized network is the internet. A cellular system providing packet data service provides a wireless link from the users of the cellular system to a router which links the users to the decentralized network. Technically, the internet is a collection of standard protocols, such as Transmission Control Protocol/Internet Protocol (TCP/IP), that enable dissimilar computer systems and networks to send and receive information. Some of the more popular protocols include: e-mail (electronic messaging), file transfer protocol (file transferring), World Wide Web (graphical interface utilizing links by hypertext documents), telnet (telephone network connections), IRC (Internet Relay Chat), gopher (information organization).

A message received from a mobile user of the packet data cellular system is forwarded by the base station to a router. The router breaks down the message into smaller pieces, know as packets. The packets travel separately across the network, but are ultimately re-formed together when all the pieces of the message arrive at its destination. During the trip, the packets merely bump along from one router to another router and through bridges and switches. No particular pathway is selected from the outset. Each router or switch looks at the destination address of the packet, but does not inspect its contents, and decides the best way to pass it along.

Since a router typically connects directly to the decentralized network and typically sends data along multiple paths to a destination there is often no need for a switch at a central location to set up a single path to and from a destination. As a result in a wireless data system providing access to a decentralized network there is not likely to be a central location, such as the BSM or MSC, which can also be used to control base stations and the update of overhead messages in the cellular system. Thus, there has been a need for overhead message delivery in a wireless communication system, such as a cellular system, providing access to a decentralized network. The present invention meets this need.

SUMMARY OF THE INVENTION

The system and method of the present invention provide a simple, but effective technique for communicating overhead messages in a wireless communication system providing access to a decentralized network, while achieving bandwidth savings as well as minimizing power consumption. In one embodiment, a wireless base station which is connected to a decentralized network transmits a sequence of signatures for overhead messages to a mobile unit. The mobile unit wakes up, receives the signatures, and compares them to signatures stored at the mobile unit. If the signatures received by the mobile unit are different from the signatures stored at the mobile unit, the mobile unit stays awake to receive the overhead messages to be transmitted by the wireless base station. If the signatures received by the mobile unit are the same as the signatures stored at the mobile unit, the mobile unit may go back to sleep.

In an alternative embodiment, the mobile unit wakes up and receives a message from a wireless base station. The mobile unit generates a signature using the message. The mobile unit compares the signature to the signature of a previous message received by the mobile unit. If the signature generated for the message received is the same as the signature of the previous message received, then the mobile unit goes back to sleep. If the signature generated for the message received is different from the signature of the previous message received, then the mobile unit updates operating parameters used for communicating with the base station.

DETAILED DESCRIPTION OF THE PREFERRED EMBODIMENT

Figure 1:
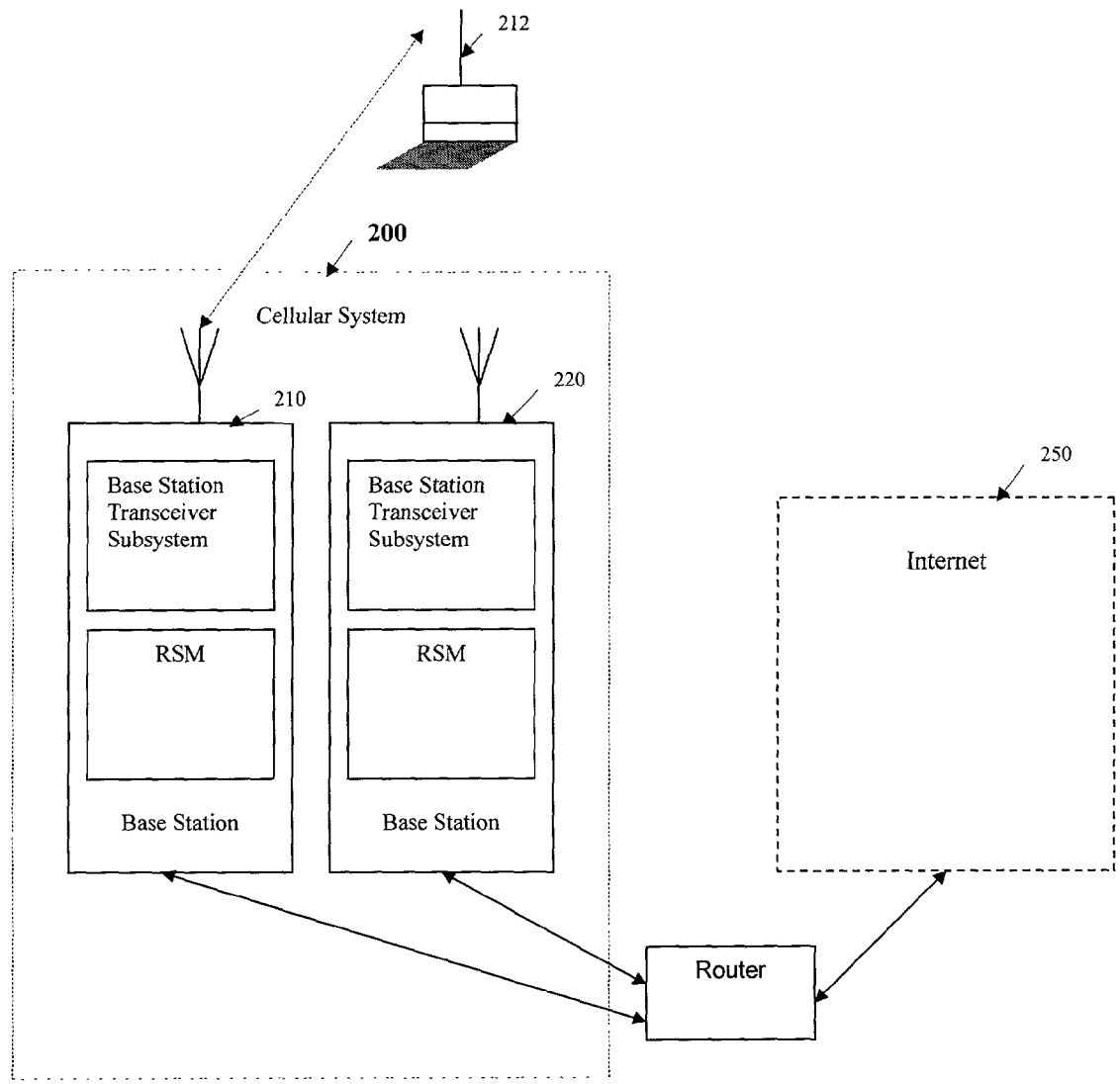
FIG. 1 is a block diagram of a wireless communication system according to a preferred embodiment of the invention.

FIG. 1 shows a system block diagram of a wireless communications system (System) 200 according to the presently preferred embodiment of the invention. System 200 may include multiple base stations (BS) 210, 220 (only two shown) each of which can communicate wirelessly with a mobile unit (MU) 202 when MU 202 is within the geographic area covered by a base station. MU 202 includes terminal equipment (TE) 206 and mobile termination (MT) 204.

MU is used to refer to the composite entity consisting of the terminal equipment and the mobile termination. In this discussion, the term "mobile unit" is used to refer generally to the remote subscriber station for the purposes of this description. Note, however, that the mobile unit may be fixed in location. The mobile unit may be part of a multiple user concentrated subscriber system. The mobile unit may be used to carry voice, data, or a combination of signal types. The term "mobile unit" is a term of art and is not meant to limit the scope or function of the unit.

Base station 210, 220 includes base station transceiver subsystem (BTS) 212, 222 and radio link protocol and signaling manager (RSM) 214, 224. Base station is used to refer to the composite entity consisting of the BTS and the RSM.

TE 206 is a device providing a user interface: typically, a laptop or notebook computer, or personal digital assistant (PDA). TE 206 is connected to MT 204 which is a wireless device providing a data modulation and demodulation capability. The BS 210, 220 is connected to the MU 202 through an radio frequency (RF) over-the-air interface. The BS 210, 220 provides a data modulation and demodulation capability for connecting to MU 202. The RSM 214, 224 serves as the radio link protocol (RLP) endpoint and the signaling endpoint, and maps network protocol addresses and mobile station identifications to each other. There may be a single RSM or an RSM co-located with each BTS.

System 200 also includes a router 230. Router 230 connects RSM 214, 224 to a decentralized network 250 composed of routers (not shown) and other networks (not shown). One example of a decentralized network is the internet. System 200 may be connected to other types of decentralized and/or centralized networks.

The RF over the air interface between BS 210, 220 and MU 202 includes a forward link for BS to mobile unit communication and a reverse link for mobile unit to BS communication. In one embodiment the forward link of System 200 is entirely dedicated to a single mobile unit at any given instant and only a single forward channel is transmitted to a mobile unit at any given instant. There are many types of communications standards with which this invention may be employed. One standard for forward and reverse links in a wireless communications system is specified in TIA/EIA Standard TIA/EIA-95-B (or IS-95) entitled "Mobile Station-Base Station Compatibility Standard for Dual Mode Wideband Spread Spectrum Cellular System." In alternative embodiments the forward link of System 200 may be the same as the IS-95 forward channels. In IS-95, multiple forward channels may be received by a mobile unit.

The System 200 forward link also differs from IS-95 in that the pilot channel is burst transmitted and embedded in the data channel as opposed to a continuously transmitted pilot channel as in IS-95. The other overhead channels also differ: the IS-95 continuous synchronization and paging channels have been combined in System 200 to a single control channel whose messages are time multiplexed on the "single user" forward link. Multiplexing is desirable because it avoids splitting the power of a base station between two or more continuously transmitted channels. Using substantially all the power of a base station to transmit a data channel allows higher data rates to be used.

System 200 is designed to operate on a separate CDMA channel (i.e., a different frequency) than an existing IS-95 system. System 200 can be deployed independently of an existing IS-95 system (or in place where no such system exists) in which case it will contain no interaction with the underlying voice system, or in a location in which a cooperating IS-95 system exists in which case IS-95 system related information will be carried on the System 200 control channel supporting handoffs to the IS-95 system, as well as providing for information delivery from the IS-95 system to System 200 in support of call delivery notifications.

In System 200, where an overhead channel such as the paging channel is time multiplexed with the forward data channel, the less time that is spent on transmitting the paging channel the more time that will be available for transmitting the forward data channel. Since, for a given constant data rate, the data throughput to a mobile unit is directly related to the amount of time that the forward data channel is transmitted to and received by the mobile unit, it is highly desirable to decrease the amount of time spent transmitting the paging channel.

In TIA/EIA-95, the paging channel is transmitted continuously and takes up part of the total, available bandwidth on the forward channel and the total available power of the base station. Because some of a base station's total available power is taken up by the paging channel, less power is available for the forward data channels. For a given signal-to-noise ratio (SNR) and a given bit error rate (BER), the maximum data transmission rate on a forward data channel is a function of the power available for a forward data channel. More specifically for a given SNR, as less power becomes available for a forward data channel the maximum data transmission rate on the forward data channel will have to be decreased to satisfy a requirement for a given BER.

For many systems and applications, where it is desirable to have high data transmission rates, it may not be possible to make more power available to the forward data channel by increasing the power at the base station transmitter. Consequently, to achieve the high transmission data rates it is necessary to take power from other channels and make that power available to the forward data channel. Unfortunately, if too much power is taken from the paging channel and given to the forward data channel, then the SNR on the paging channel may be so detrimentally affected as to also detrimentally affect the BER on the paging channel, making the information sent on the paging channel unintelligible. However, where it is not possible to increase transmitter power, to appreciably increase the data transmission rate it may be necessary to significantly increase the power available to the forward data channel by taking a significant amount of power from the paging channel (or some other channel). To appreciably increase the data transmission rate, it may be necessary to take all the power from the paging channel and give it to the forward data channel and to time multiplex the paging and data channels. For a given transmitter power, a system in which the paging channel and data channel are time multiplexed allows for higher transmission data rates to a user than a system in which the paging channel and data channel are transmitted simultaneously and share the given transmitter power.

While it is true that higher maximum transmission data rates are possible when the paging channel and the forward data channel are time multiplexed, to achieve high effective transmission data rates the time spent transmitting the paging channel must be minimized as the following equation suggests:

Effective transmission data rate=$Tr_{Max}*Tfd/(Tfd+Tpc)$, where $Tr_{Max}$ is the maximum transmission data rate, Tfd is the duration of the transmission of the forward data channel during one period, and Tpc is the duration of the transmission of the paging channel during one period.

Figure 2:
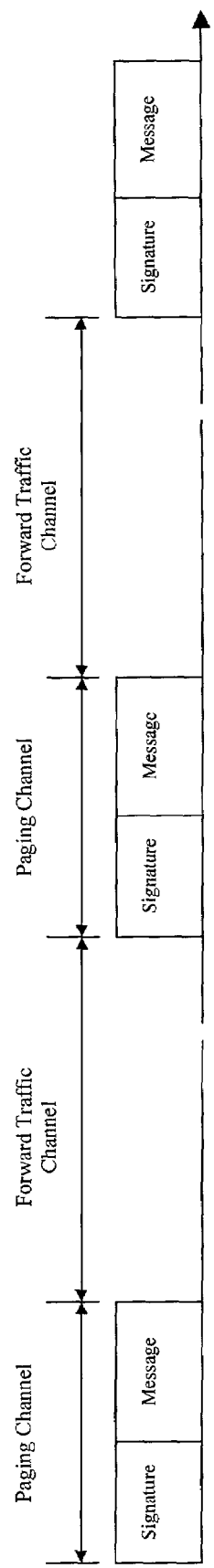
FIG. 2 shows a structure of a forward link of a wireless communication system in accordance with the invention.

FIG. 2 generally describes the structure of the forward link of an embodiment in accordance with the invention. The forward link is a periodic cycle of a data stream which includes a paging channel multiplexed with a forward data channel. The paging channel includes a signature capsule and an overhead message capsule. In the embodiment illustrated in FIG. 2, the signature and overhead message capsules are transmitted with a period having a duration of 400 milliseconds. In alternative embodiments, the period may have other durations. The signature capsule contains at least one signature. The signature may represent only one overhead message or may represent a group of more than one message (i.e., the signature is changed whenever at least one message in a group of more than one message is changed).

The overhead message capsule contains at least one overhead message. Overhead messages are not addressed to any specific mobile unit but are intended for distribution to each mobile unit within the corresponding coverage area. Possible overhead messages include system parameters, access parameters, channel list, and neighbor list overhead messages. Each type of overhead message must be broadcast at least once per second. In the preferred embodiment the messages are broadcast every 400 milliseconds. For example, the neighbor list overhead message continually broadcasts a list of neighboring base stations through which communication may be possible. The mobile units use the neighbor list to monitor signals from the neighboring base stations in the event that the mobile unit enters the coverage area of neighboring base stations. Cellular systems may have other types of overhead messages. It is well-known in the art that overhead messages may include many different parameters which are needed to establish and maintain communication between a mobile unit and a base station.

The overhead message or messages are typically received and processed by a mobile unit when a mobile unit is not engaged in a call or attempting to engage in a call, (i.e., when it is in an 'idle state'). The term idle state is somewhat of a misnomer because the mobile unit can be very busy in the idle state. During the idle state, the mobile station periodically wakes up and listens to the paging channel and processes the messages on that channel. The overhead messages may remain the same for a substantial period of time during which the mobile station periodically wakes up and listens to the paging channel. Since it is not desirable to have the mobile unit wake up, receive the overhead message, and decode it only to determine that the overhead message is the same as the previous message that was decoded earlier, in the interest of conserving battery power, a signature is transmitted along with the overhead message. When the mobile unit wakes up, it receives the signature of the overhead message which will be received later and decides whether to stay awake and receive the overhead message. In many instances, the mobile unit will go back to sleep after receiving the signature because the signature is the same as the signature received the last time the mobile unit woke up. Since listening for overhead messages requires a certain amount of power and since the listening function is performed frequently (as often as once per second), limiting the amount of time a mobile unit performs the listening function reduces the overall power consumption of that mobile unit and therefore increases the life of any battery or other power storage system utilized by that mobile unit. Significant power savings may occur because in many instances the overhead messages may remain the same for a substantial period of time.

Figure 3:
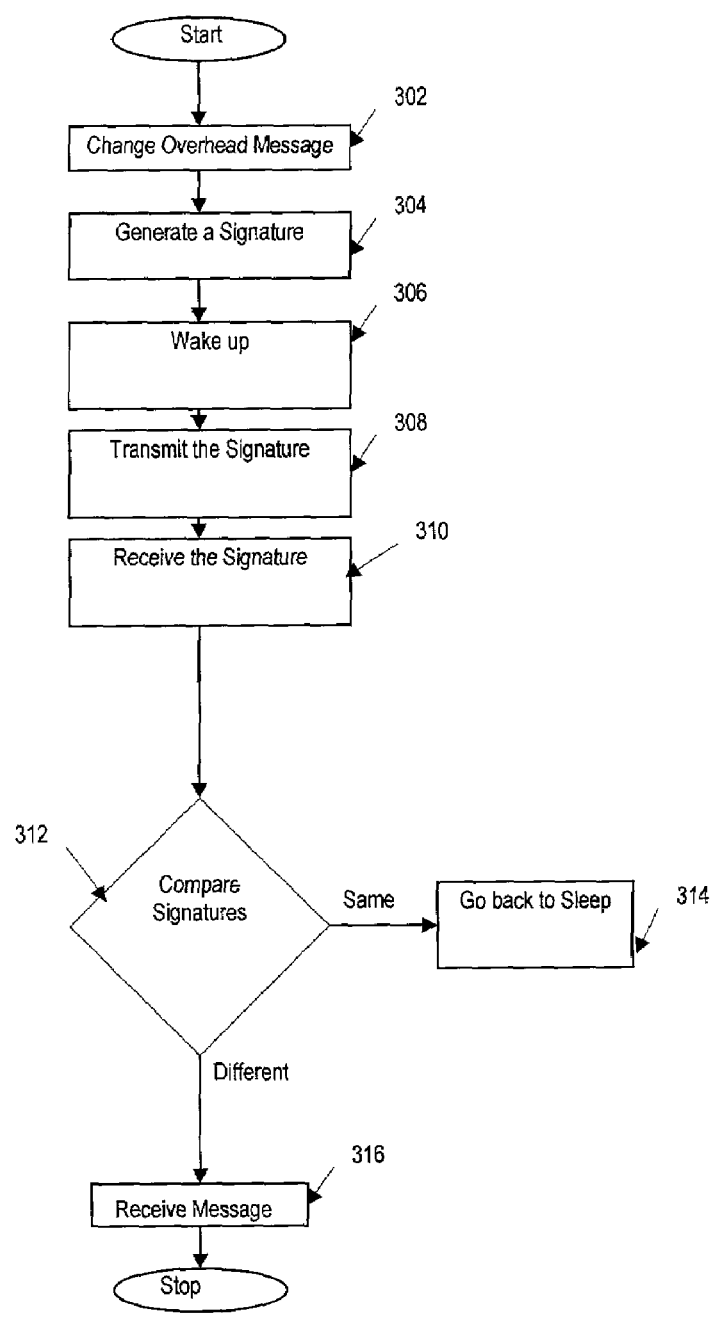
FIG. 3 shows a process for communicating overhead messages using the structure of the forward link illustrated in FIG. 2.

FIG. 3 illustrates a process for updating overhead messages for an embodiment in accordance with this invention and having the forward link with the structure illustrated in FIG. 2. Referring to FIG. 3, an overhead message is changed at step 302 at the BS 210. At step 304, at the BS 210 a signature is generated for the overhead message that was changed. A signature can be generated by hashing the message using a well-known hashing function to produce a sixteen or thirty-two bit signature. Hashing a message to generate a signature can be performed by a signature generator using well-known arithmetic logic (not shown) or a general purpose microprocessor (not shown) and need not be described in detail here. One of ordinary skill in the art would recognize that the signature may be generated using other forms of logic not described herein. The length of the signature in bits depends on system requirements that two consecutive messages share different signatures (i.e., avoid collisions). There is a definite but small probability that two different consecutive messages may share the same signature because hashing only serves to compress the message space into a smaller signature space in which more than one message may have the same signature. In the event that two consecutive messages are different but the hashing produces the same signature for both, at step 304, the hashing may be repeated with a random number until a signature that is different from the signature of a predetermined number of previous messages is generated. Alternatively, the signature can be generated by incrementing a counter.

At step 306 the MU 202 wakes up and listens. At step 308 the BS 210 transmits the signature to the MU 202. At step 310, the MU 202 receives the signature. At step 312, the MU 202 retrieves a previous signature from memory (not shown). At step 312, the MU 202 compares the signature received at step 310 with the previous signature. The circuitry or signature comparison element required for performing the comparison at step 312 can be realized by a variety of components including microprocessors as well as combinatorial logic and other logic circuits. If the signature received at step 310 is the same as the previous signature, at step 314 the MU 202 goes back to sleep. If the signature received at step 310 is different from the previous signature, at step 316, the MU 202 stays awake and listens to receive the message. After the MU 202 receives the message it updates the operating parameters of the MT 204 so that it will be able to communicate effectively with System 200.

The structure of the overhead messages on the paging channel may be in accordance with the structure required by a technique known as slotted paging. Slotted paging is useful for reducing power consumption by a mobile unit. More information on slotted mode operation is disclosed in U.S. Pat. No. 5,392,287 entitled "APPARATUS AND METHOD FOR REDUCING POWER CONSUMPTION IN A MOBILE COMMUNICATIONS RECEIVER" issued Feb. 21, 1995, assigned to the assignee of the present invention, and incorporated herein by reference.

Figure 4:
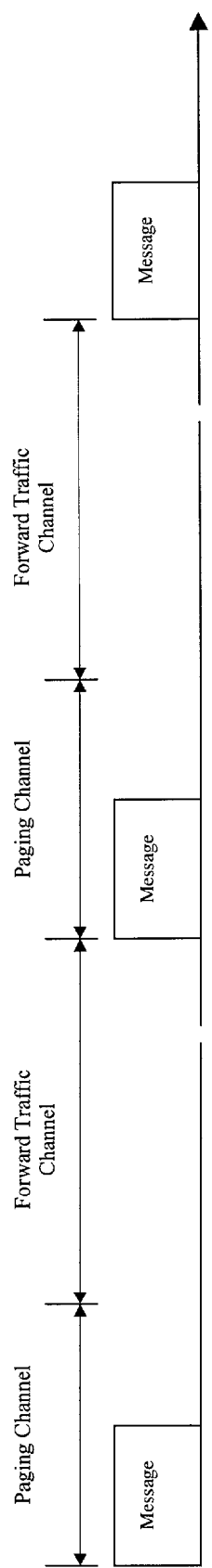
FIG. 4 shows an alternative structure of a forward link of a wireless communication system in accordance with the invention.

FIG. 4 generally describes the structure of the forward link of an alternative embodiment in accordance with the invention. The forward link is a periodic cycle of a data stream which includes a paging channel multiplexed with a forward data channel. The paging channel includes an overhead message capsule. In the embodiment illustrated in FIG. 4, the overhead message capsules are transmitted with a period having a duration of 400 milliseconds. In alternative embodiments, the period may have other durations.

Figure 5:
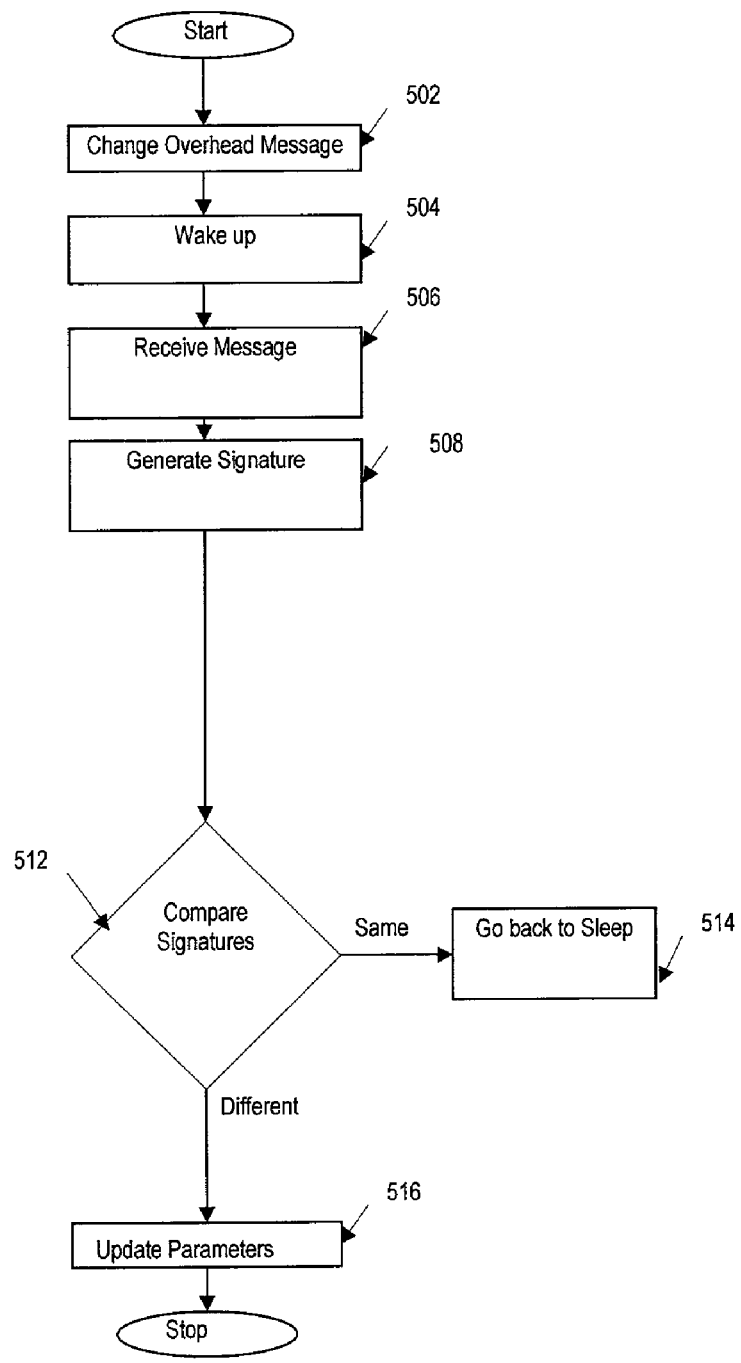
FIG. 5 shows an alternative process for communicating overhead messages using the structure of the forward link illustrated in FIG. 4.

FIG. 5 illustrates a process for updating overhead messages for an alternative embodiment in accordance with this invention and having the forward link with the structure illustrated in FIG. 4. Referring to FIG. 5, an overhead message is changed at step 502 at the BS 210. At step 504, the MU 202 wakes up and listens. At step 506 the BS transmits the message to the MU 202 and the MU 202 receives the message. At step 508 the MU 202 generates a signature for the message using a hashing function as described with regards to Process 300 in FIG. 3. Hashing a message to generate a signature can be performed by a signature generator using well-known arithmetic logic (not shown) or a general purpose microprocessor (not shown) and need not be described in detail here. One of ordinary skill in the art would recognize that the signature may be generated using other forms of logic not described herein. At step 512, the MU 202 retrieves a previous signature from storage (not shown) at the MU 202. At step 512, the MU 202 compares the previous signature with signature generated at step 508. The circuitry or signature comparison element required for performing the comparison at step 512 can be realized by a variety of components including microprocessors as well as combinatorial logic and other logic circuits. If the signature generated at step 508 is the same as the previous signature, at step 514 the MU 202 goes back to sleep. If the signature generated at step 508 is different from the previous signature, at step 516 the MU 202 updates its operating parameters with the information contained in the message received at step 506.

The generation and receipt of CDMA signals is disclosed in U.S. Pat. No. 4,901,307 entitled "SPREAD SPECTRUM MULTIPLE ACCESS COMMUNICATION SYSTEMS USING SATELLITES OR TERRESTRIAL REPEATERS" and in U.S. Pat. No. 5,103,459 entitled "SYSTEM AND METHOD FOR GENERATING WAVEFORMS IN A CDMA CELLULAR TELEPHONE SYSTEM", both of which are assigned to the assignee of the present invention and incorporated herein by reference.

Demodulation of multiple signals is disclosed in U.S. Pat. No. 5,490,165 entitled "DEMODULATION ELEMENT ASSIGNMENT IN A SYSTEM CAPABLE OF RECEIVING MULTIPLE SIGNALS" and in U.S. Pat. No. 5,109,390 entitled "DIVERSITY RECEIVER IN A CDMA CELLULAR TELEPHONE SYSTEM", both of which are assigned to the assignee of the present invention and incorporated herein by reference.

Although the invention has been described in conjunction with particular embodiments, it will be appreciated that various modifications and alterations may be made by those skilled in the art without departing from the spirit and scope of the invention. The invention is not to be limited by the foregoing illustrative details, but rather is to be defined by the amended claims.

The invention claimed is:

1. A method for communicating with a mobile station by way of a forward channel in a wireless communication system, the method comprising:
   receiving a message capsule over the forward channel;
   calculating a signature from the message capsule at the mobile station; and
   comparing the signature with one or more signatures previously stored at the mobile station.

2. An apparatus for communicating with a mobile station by way of a forward channel in a wireless communication system, comprising:
   a base station configured to:
      transmit a message capsule over the forward channel;
      generate a signature for the message capsule, the signature being generated by hashing the message capsule, wherein the hashing comprises hashing the message capsule to generate a first hash and rehashing the message capsule if the first hash of the message matches a signature of a previous message capsule; and
      transmit a signature in a separate signature capsule over the forward channel.

3. An apparatus as claimed in claim 2, wherein the rehashing comprises adding a random value to the first hash.

4. An apparatus as claimed in claim 2, wherein the rehashing is done if the signature of a previous message capsule was generated within a time period $T_{Delta}$.

5. An apparatus as claimed in claim 4, wherein the time period $T_{Delta}$ is larger than the largest allowed sleep time of any mobile station that could be communicated with the wireless communication system.

6. An apparatus as claimed in claim 2, wherein the hashing is arranged to generate a sixteen bit value for the signature.

7. An apparatus as claimed in claim 2, wherein the hashing is arranged to generate a thirty-two bit value for the signature.

8. A method as claimed in claim 1, further comprising assigning a value stored in a counter to the signature.

9. A method as claimed in claim 8, wherein the counter is incremented after a signature is generated.

10. A method as claimed in claim 8, wherein the counter is incremented if the message capsule is different than a previously transmitted message capsule.

* * * * *